United States Patent
Berchtold

(10) Patent No.: US 7,743,909 B2
(45) Date of Patent: Jun. 29, 2010

(54) CONVEYING INSTALLATION FOR TRANSPORTING GOODS BY WAY OF A CONVEYOR BELT

(75) Inventor: Thomas Berchtold, Schwarzenberg (AT)

(73) Assignee: Innova Patent GmbH, Wolfurt (AT)

( * ) Notice: Subject to any disclaimer, the term of this patent is extended or adjusted under 35 U.S.C. 154(b) by 69 days.

(21) Appl. No.: 11/958,997

(22) Filed: Dec. 18, 2007

(65) Prior Publication Data

US 2009/0101473 A1    Apr. 23, 2009

(30) Foreign Application Priority Data

Oct. 22, 2007   (AT)   .............................. A 1703/2007

(51) Int. Cl.
*B65G 45/14* (2006.01)
*B65G 45/12* (2006.01)
*B65G 45/16* (2006.01)

(52) U.S. Cl. ........................ 198/498; 198/497; 198/499

(58) Field of Classification Search ................... 198/98, 198/497, 499
See application file for complete search history.

(56) References Cited

U.S. PATENT DOCUMENTS

| | | | | |
|---|---|---|---|---|
| 4,182,444 | A * | 1/1980 | Fisher | 198/499 |
| 6,283,274 | B1 * | 9/2001 | Dolan et al. | 198/499 |
| 6,588,583 | B2 * | 7/2003 | Trieb | 198/845 |
| 2008/0053792 | A1 * | 3/2008 | Swinderman et al. | 198/499 |

FOREIGN PATENT DOCUMENTS

DE     19853519 A1 *  5/2000

\* cited by examiner

*Primary Examiner*—Gene Crawford
*Assistant Examiner*—Yolanda Cumbess
(74) *Attorney, Agent, or Firm*—Laurence A. Greenberg; Werner H. Stemer; Ralph E. Locher

(57) ABSTRACT

A conveying installation for transporting goods has a conveyor belt that is guided over deflecting drums in a loading station and in an unloading station. The conveyor belt is mounted to the underside of supporting bars which are oriented transversely to the movement direction of the conveyor belt. Supporting rollers mounted in each case at the two lateral ends of the supporting bars roll on two pairs of supporting cables or supporting rails which are provided along the installation and are respectively assigned to the forward strand and the return strand of the conveyor belt. An assembly for cleaning the conveyor belt is formed with a scraper strip or the like which can be moved in the direction of the conveyor belt by way of a closed-loop controller, which is controlled by the position of the supporting bars. The scraper strip is brought more or less into abutment against the conveyor belt between the supporting bars, and it is raised off from the conveyor belt in the region of a supporting bar.

8 Claims, 4 Drawing Sheets

CONVEYING INSTALLATION FOR TRANSPORTING GOODS BY WAY OF A CONVEYOR BELT

CROSS-REFERENCE TO RELATED APPLICATION

This application claims the priority, under 35 U.S.C. §119, of Austrian patent application A 1703/2007, filed Oct. 22, 2007; the prior application is herewith incorporated by reference in its entirety.

BACKGROUND OF THE INVENTION

Field of the Invention

The present invention relates to a conveying installation for transporting goods, having a conveyor belt which is guided over deflecting drums in a loading station and in an unloading station of the installation and which is fastened on the underside of supporting bars which are oriented transversely to the movement direction of the conveyor belt and are spaced apart from one another in the movement direction of the conveyor belt. Supporting rollers are mounted in each case at the two lateral ends of the supporting bars, and these supporting rollers roll on two pairs of supporting cables or supporting rails which are provided along the installation and are respectively assigned to the forward strand and the return strand of the conveyor belt. There are also provided means for cleaning the conveyor belt.

Such a conveying installation, which is described for example from U.S. Pat. No. 6,588,583 B2, can be used to convey, using conveyor belts designed with undulating edges, articles such as teardown materials, ore-bearing minerals, coal and the like from the region in which they occur or are extracted, beyond obstacles such as valleys, into another region in which they are stored or processed, or from which they are transported away by way of motor vehicles. Since the conveyor belt of such a conveying installation is guided along supporting cables, the relevant articles can be conveyed a long distance from a loading station to an unloading station with comparatively low technical outlay.

Prior art conveying installations of this type, however, have the difficulty that in the unloading station, in which the conveyor belt is guided over a deflecting drum, although most of the articles located on the conveyor belt drop off the latter, fractions of the articles remain in each case in the separate trough-like loading regions formed on the transporting belt by the supporting bars, and these article fractions, during return of the conveyor belt, either drop off the latter or remain thereon, as a result of which they are conveyed back to the loading station.

In order to avoid the situation where the article fractions remaining on the return strand of the conveyor belt drop off, since this contaminates the regions, objects and the like which are located beneath the conveying installation, it is known to provide, downstream of the unloading station, an arrangement which turns the return strand of the conveyor belt in the upward direction. In this case, however, it is necessary to provide, upstream of the loading station, a further arrangement to turn the return strand again in order to allow it to be guided over the deflecting drum located in the loading station and then reloaded.

However, on the one hand, such turning arrangements require further design outlay, which makes these conveying installations more expensive. On the other hand, the difficulty remains, on turning the return strand of the conveyor belt, that the article fractions remaining on the conveyor belt are conveyed back to the loading station. As a result, in addition to the conveying capacity being reduced and the drive power which is necessary being increased, it is also the case that, as the conveying operation progresses, the article fractions remaining on the return strand of the conveyor belt increase, as a result of which the disadvantageous effects explained above also become more pronounced.

In order to avoid the situation where more and more article fragments and fractions collect on the return strand of the conveyor belt in the unloading station, it is known to assign the conveyor belt a vibrating means or a spraying means, which remove the article fractions remaining on the conveyor belt in the unloading station. However, these arrangements give rise to a high level of additional design outlay and, furthermore, they do not perform the desired cleaning action to the full extent. Since the conveyor belt is fastened on the underside of supporting bars, which subdivide it into trough-like regions, it is not possible, on the other hand, to clean the conveyor belt downstream of the unloading station by assigning it a rigid scraper strip. For this reason, it is not known from the prior art, for the purpose of removing article fractions remaining on the conveyor belt downstream of the unloading station, to assign this conveyor belt a scraper arrangement for removing the article fractions located on it.

SUMMARY OF THE INVENTION

It is accordingly an object of the invention to provide a conveying installation for transporting goods by way of a conveyor belt which overcomes the above-mentioned disadvantages of the heretofore-known devices and methods of this general type and which provides for a cleaning configuration which meets the technical requirements.

With the foregoing and other objects in view there is provided, in accordance with the invention, a conveying installation for transporting goods, comprising:

a conveyor belt extending between a loading station and an unloading station in a forward strand and a return strand and being guided about deflecting drums in the loading and unloading stations;

a plurality of supporting bars oriented transversely to a travel direction of said conveyor belt, spaced apart from one another in the travel direction of said conveyor belt, and having said conveyor belt mounted to an underside thereof;

two pairs of supporting cables or supporting rails extending along the installation respectively assigned to said forward strand and said return strand of said conveyor belt;

said supporting bars having lateral ends and supporting rollers mounted to said lateral ends and disposed for rolling on said supporting cables or supporting rails;

a configuration for cleaning said conveyor belt including a scraper strip movably disposed in a direction to said conveyor belt and a control assembly for moving said scraper strip towards said conveyor belt;

said control assembly being controlled by a position of said supporting bars, wherein said scraper strip is brought substantially into abutment against said conveyor belt between said supporting bars, whereas said scraper strip is lifted off from said conveyor belt in a region of a respective said supporting bar.

In other words, the objects of the invention are achieved in that the assembly for cleaning the conveyor belt includes a scraper strip or the like which can be moved in the direction of the conveyor belt by way of a control assembly, the control assembly being controlled by the position of the supporting bars such that the scraper strip or the like is brought at least more or less into abutment against the conveyor belt between the supporting bars, whereas it is raised off from the conveyor belt in the region of a supporting bar.

The scraper strip is preferably fastened on a shaft which can be pivoted in relation to the conveyor belt by means of a servomotor. Also preferably provided is a restoring spring, by means of which the scraper strip can be raised off in particular when the servomotor fails. Furthermore, preferably the deflecting drum located in the unloading station is assigned at least one proximity switch which can sense the position of a supporting bar moving in the direction of the scraper strip and can control the servomotor. Furthermore, preferably the control assembly is designed with at least one interrupting rod, which switches off the drive for the conveying installation when the control assembly malfunctions.

Other features which are considered as characteristic for the invention are set forth in the appended claims.

Although the invention is illustrated and described herein as embodied in conveying installation for transporting goods, having a conveyor belt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF DRAWING

DETAILED DESCRIPTION OF THE INVENTION

Figure 1:
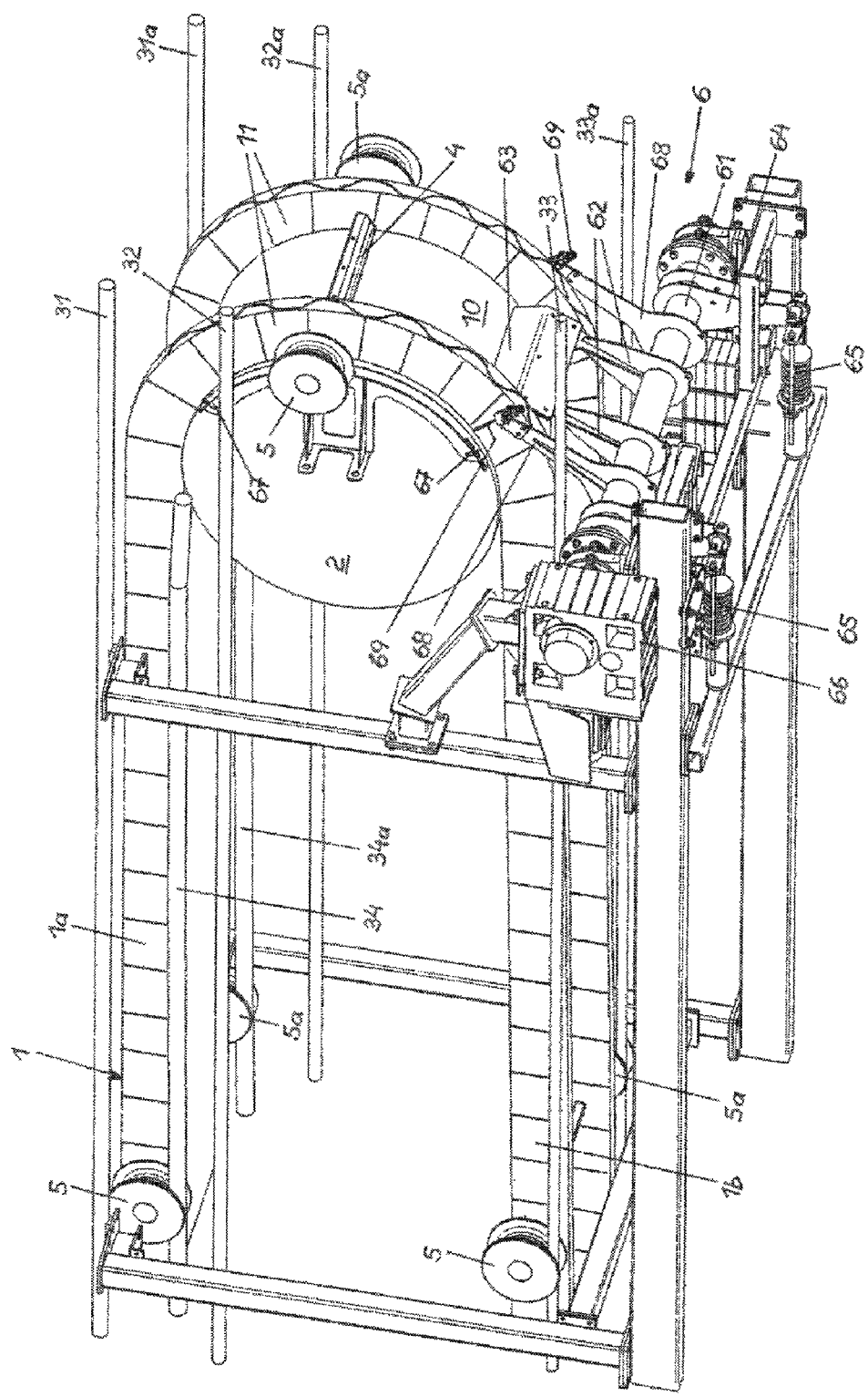
FIG. 1 shows an axonometric illustration of a conveying installation according to the invention in the region of the unloading station.

Referring now to the figures of the drawing in detail and first, particularly, to FIG. 1, there is illustrated an unloading station of a conveying installation for goods such as breakdown materials, overburden materials, ore-bearing minerals, coal and the like. The conveying installation has a conveyor belt 1 which is guided over deflecting drums in the loading station and in the unloading station (i.e., the terminal stations). At least one of these deflecting drums is a driven pulley. The conveyor belt 1, which has a more or less rectangular conveying region in cross section, is designed laterally with undulating edges 11, as a result of which it can be guided, in the loading station and in the unloading station, over the deflecting drums located in these stations. In the unloading station, the conveyor belt is guided over the deflecting drum 2.

The conveying installation also has three pairs of cables 31 and 31a, 32 and 32a and 33 and 33a, which are connected to one another along the entire extent of the installation by means of spaced-apart supporting frames, as a result of which these cables are spaced apart from one another by the necessary distances throughout the installation. The two top cables 31 and 31 a here serve as supporting cables of the conveying installation, and these absorb the loading which occurs in the conveying installation. In contrast, the two central cables 32 and 32a serve as guide cables for the strand 1a of the conveyor belt 1, this strand moving from the loading station to the unloading station, and the two bottom cables 33 and 33a serve as guide cables for the strand 1b of the conveyor belt 1, this strand moving back from the unloading station to the loading station.

The conveyor belt 1 is also provided with supporting bars 4, which have the conveyor belt 1 fastened on their undersides (here, defined with reference to the forward strand, where the conveyor belt carries the goods) and are spaced apart from one another by distances of, for example, 5 m to 8 m. These supporting bars 4 subdivide the conveyor belt 1 into troughlike regions, and this makes it possible for the conveyor belt to be guided even over inclined sections of the conveying path without the articles located on the conveyor belt sliding off as a result. Supporting rollers 5 and 5a are mounted at the two ends of the respective supporting bars 4, in which case the supporting rollers 5 and 5a of the strand 1a of the conveyor belt 1, this strand moving from the loading station to the unloading station, roll along the guide cables 32 and 32a and the supporting rollers 5 and 5a of the strand 1b of the conveyor belt 1, this strand moving back to the loading station, roll along the guide cables 33 and 33a.

In the region of the unloading station, the supporting rollers 5 and 5a are guided along guide rails 34 and 34a. Such guide rails are also provided in the loading station.

In the unloading station, the conveyor belt 1 is assigned a scraper arrangement 6 by means of which, once the conveyor belt 1 has been unloaded, any article fractions remaining on the conveyor belt are removed. The scraper arrangement 6 has a shaft 61 which is designed with radially projecting supporting arms 62, on which a scraper strip 63 or the like is fastened. The shaft 61 is additionally designed with radially projecting regulating arms 64 which are subject to the action of restoring springs 65, which cause the shaft 61 to rotate in the clockwise direction, as a result of which the scraper strip 63 is pivoted away from the conveyor belt 1. Furthermore, the shaft 61 is assigned a servomotor 66, by means of which it is rotated such that the scraper strip 63 is pivoted in the direction of the conveyor belt 1, counter to the action of the restoring springs 65, and is also pivoted away from the conveyor belt 1. As an alternative, the scraper strip 63 is only raised off from the conveyor belt 1 by the restoring springs 65.

The servomotor 66 is controlled by proximity switches 67, which each sense a supporting bar 4 located in the region of the same. The output signals of the proximity switches 67 are transmitted to a control unit for the servomotor 66.

This scraper configuration 6 operates as follows:

The servomotor 66 pivots the scraper strip 63, counter to the action of the restoring springs 65, onto the loading surface 10 of the conveyor belt 1, the scraper strip being located between the two undulating edges 11. As a result, any articles remaining on the conveyor belt 1 are removed from the same. As soon as the scraper strip 63 approaches a supporting bar 4, it is pivoted away from the conveyor belt 1 by the servomotor 66. If functioning of the servomotor 66 ceases, the scraper strip 63 is pivoted away from the conveyor belt 1 by the restoring spring 65.

Figure 2:
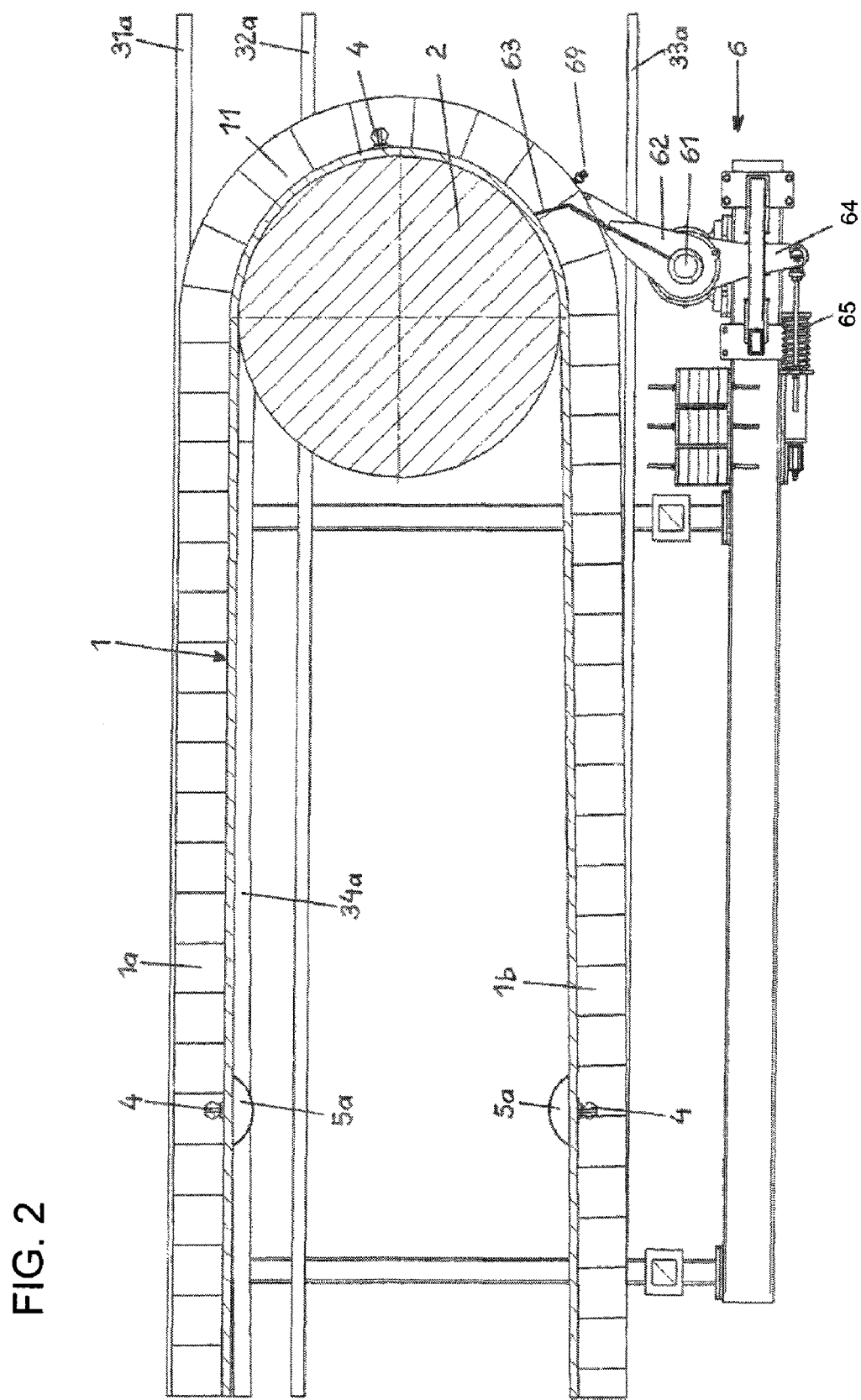
FIG. 2 is a side view of a first operating positions of the conveying installation according to the invention in the region of the unloading station.
Figure 2A:
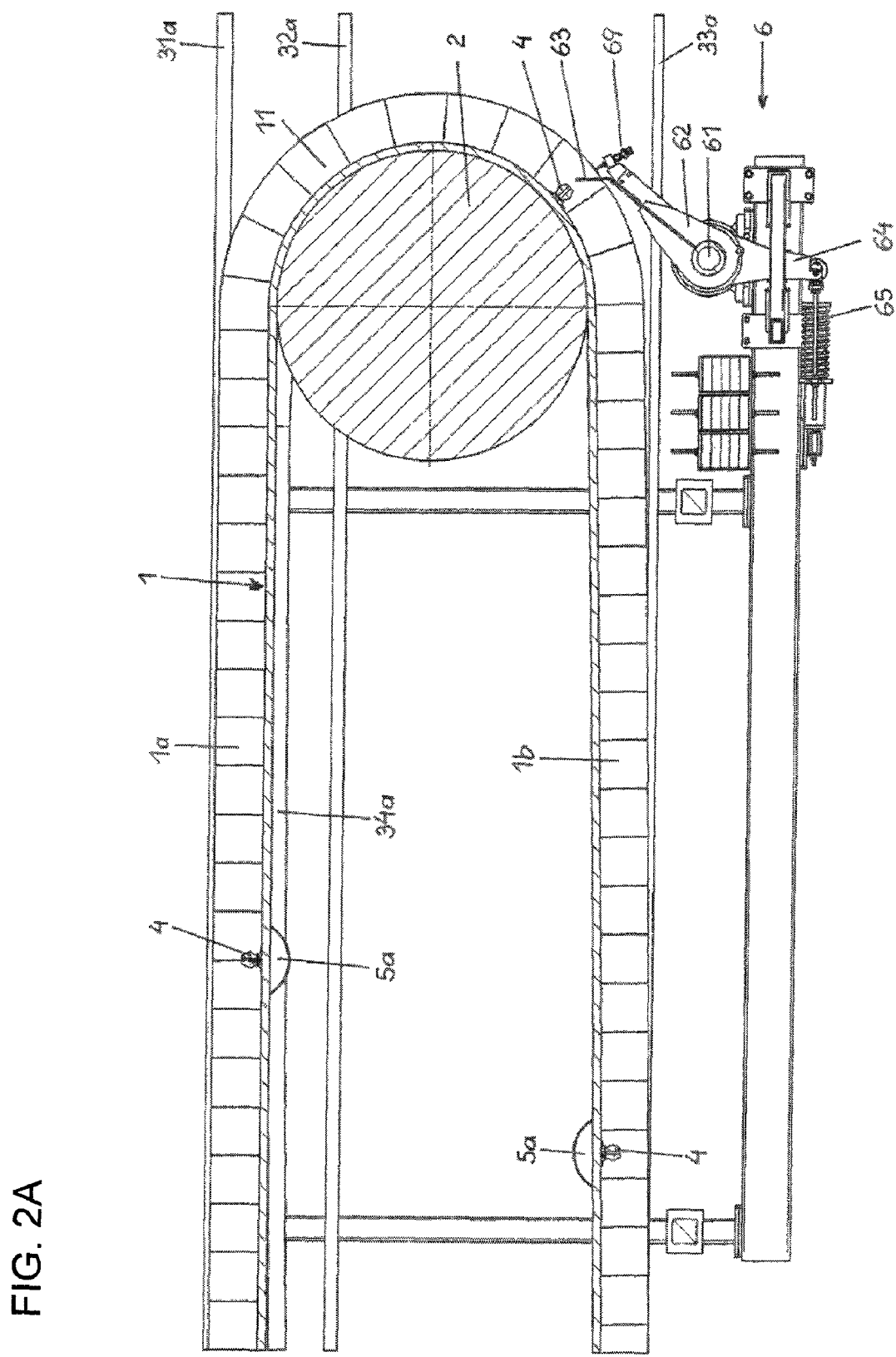
FIG. 2A is a similar view of a second operating position.
Figure 2B:
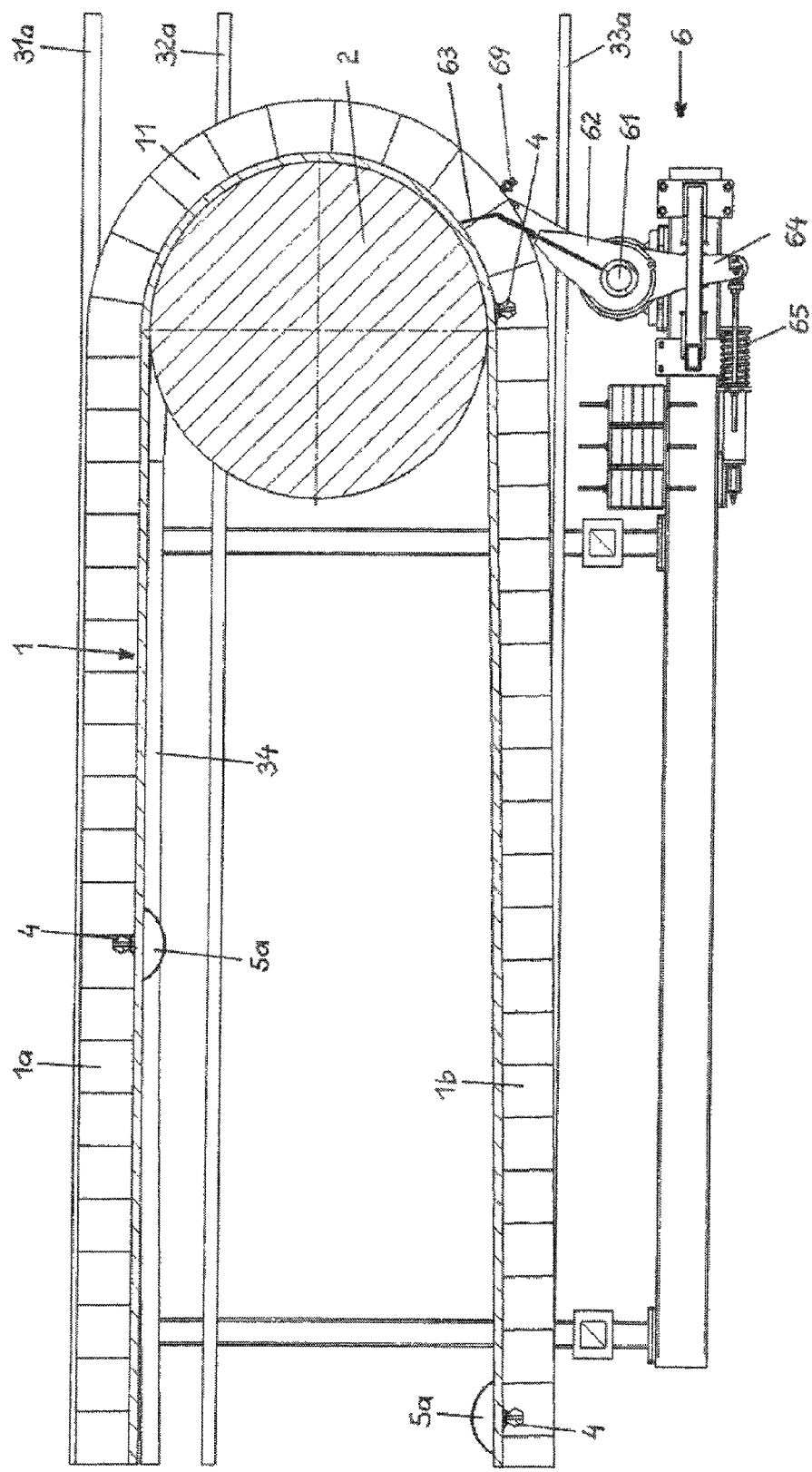
FIG. 2B is a similar view of a third operating position.

FIGS. 2, 2A, and 2B illustrate three different operating positions of the scraper strip 63, as follows:

In FIG. 2, the scraper strip 63 is located in the position in which it has been pivoted in the direction of the conveyor belt 1, as a result of which the latter is cleaned by the scraper strip 63.

In FIG. 2A, a supporting bar 4 has moved in the direction of the scraper strip 63, for which reason the latter has been raised off by the servomotor 66.

In FIG. 2B, this supporting bar 4 has left the region of the scraper strip 63, whereupon the latter has been pivoted in the direction of the conveyor belt 1 again by means of the servomotor 66.

Further located on the shaft 61 are two radial supporting arms 68 for interrupting rods 69, onto which the bearing pins of the supporting rollers 5 and 5a run when, as a result of the control assembly 65, 66 malfunctioning, the scraper strip 63 is not pivoted off from the conveyor belt 1 even though the latter is approaching a supporting bar 4. In this case, the drive for the conveying installation is switched off by the interrupting rods 69.

The invention claimed is:

1. A conveying installation for transporting goods, comprising:
   a conveyor belt extending between a loading station and an unloading station in a forward strand and a return strand and being guided about deflecting drums in the loading and unloading stations;
   a plurality of supporting bars oriented transversely to a travel direction of said conveyor belt, spaced apart from one another in the travel direction of said conveyor belt, and having said conveyor belt mounted to an underside thereof;
   two pairs of supporting cables or supporting rails extending along the installation respectively assigned to said forward strand and said return strand of said conveyor belt;
   said supporting bars having lateral ends and supporting rollers mounted to said lateral ends and disposed for rolling on said supporting cables or supporting rails;
   a configuration for cleaning said conveyor belt including a pivotally mounted arm, a scraper strip mounted on said arm, a servomotor for pivoting said arm and moving said scraper strip towards said conveyor belt, and a control assembly connected to said servomotor for causing said servomotor to move said scraper strip towards said conveyor belt;
   said control assembly being controlled by a position of said supporting bars, wherein said scraper strip is brought substantially into abutment against said conveyor belt between said supporting bars, whereas said scraper strip is lifted off from said conveyor belt in a region of a respective said supporting bar in order to allow said supporting bar to pass by said scraper strip.

2. The conveying installation according to claim 1, wherein said control assembly is a closed-loop control system.

3. The conveying installation according to claim 1, which further comprises a restoring spring disposed to pivot said scraper strip away from said conveyor belt.

4. The conveying installation according to claim 3, wherein said restoring spring is configured to pivot said scraper strip away from said conveyor belt when said servomotor fails.

5. The conveying installation according to claim 3, which comprises at least one proximity switch assigned to said deflecting drum in the unloading station, said at least one proximity switch being disposed to sense a position of a respective supporting bar moving in a direction of said scraper strip and being configured to control said servomotor.

6. The conveying installation according to claim 1, which comprises at least one interrupting rod configured to switch off a drive for said conveying installation when said control assembly malfunctions.

7. A conveying installation for transporting goods, comprising:
   a conveyor belt extending between a loading station and an unloading station in a forward strand and a return strand and being guided about deflecting drums in the loading and unloading stations;
   two pairs of supporting cables or supporting rails extending along the installation respectively assigned to said forward strand and said return strand of said conveyor belt;
   a plurality of supporting bars oriented transversely to a travel direction of said conveyor belt, spaced apart from one another in the travel direction of said conveyor belt, and having said conveyor belt mounted to an underside thereof;
   said supporting bars having lateral ends and supporting rollers mounted to said lateral ends and disposed for rolling on said supporting cables or supporting rails;
   a configuration for cleaning said conveyor belt including a scraper strip movably disposed in a direction towards said conveyor belt and away from said conveyor belt, a servomotor for moving said scraper strip towards and into abutment with said conveyor belt, and including a control assembly for directed movement of said scraper strip towards and away from said conveyor belt;
   said control assembly being controlled by a position of said supporting bars and said control assembly is configured to:
      bring said scraper strip substantially into abutment against said conveyor belt for scraping said conveyor belt between said supporting bars;
      temporarily lift said scraper strip away from said conveyor belt to allow a respective said supporting bar to pass through; and
      bring said scraper strip back substantially into abutment against said conveyor belt for scraping said conveyor belt between said supporting bars after the respective said supporting bar has passed through.

8. The conveying installation according to claim 7, wherein said control assembly is a closed-loop control system.

* * * * *